United States Patent
Lei et al.

(10) Patent No.: US 12,177,786 B2
(45) Date of Patent: Dec. 24, 2024

(54) POWER CONTROL FOR HYBRID AUTOMATIC REPEAT REQUEST FEEDBACK SIGNAL IN RANDOM ACCESS

(71) Applicant: QUALCOMM Incorporated, San Diego, CA (US)

(72) Inventors: Jing Lei, San Diego, CA (US); Wanshi Chen, San Diego, CA (US); Ruiming Zheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 17/640,250

(22) PCT Filed: Oct. 3, 2019

(86) PCT No.: PCT/CN2019/109811
§ 371 (c)(1),
(2) Date: Mar. 3, 2022

(87) PCT Pub. No.: WO2021/062871
PCT Pub. Date: Apr. 8, 2021

(65) Prior Publication Data
US 2022/0386244 A1 Dec. 1, 2022

(51) Int. Cl.
*H04W 52/14* (2009.01)
*H04L 1/1812* (2023.01)
(Continued)

(52) U.S. Cl.
CPC ......... *H04W 52/146* (2013.01); *H04L 1/1812* (2013.01); *H04W 52/08* (2013.01);
(Continued)

(58) Field of Classification Search
CPC .... H04L 1/1812; H04W 52/08; H04W 52/50; H04W 52/367; H04W 72/21;
(Continued)

(56) References Cited

U.S. PATENT DOCUMENTS 9,019,872 B2 * 4/2015 Papasakellariou ...... H04L 5/001
370/280
11,245,507 B2 * 2/2022 Ekpenyong ........... H04L 5/0055
(Continued)

FOREIGN PATENT DOCUMENTS

CN       103098536 A       5/2013
CN       105359555 A       2/2016

OTHER PUBLICATIONS

3GPP TS 38.213: "3rd Generation Partnership Project, Technical Specification Group Radio Access Network, NR, Physical Layer Procedures for Control (Release 15)", 3GPP Standard, Technical Specification, 3rd Generation Partnership Project, Mobile Competence Centre, 650, Route Des Lucioles, F-06921 Sophia-Antipolis Cedex, France, vol. RAN WG1. No. V15.7.0, Sep. 28, 2019, pp. 1-108, XP051785089, section 7.1.1, 7.2, 7.7.1.
(Continued)

*Primary Examiner* — David Q Nguyen
(74) *Attorney, Agent, or Firm* — Harrity & Harrity, LLP (57) ABSTRACT

Various aspects of the present disclosure generally relate to wireless communication. In some aspects, a user equipment (UE) may receive a response message associated with a random access message, wherein the response message includes an identifier of the UE; select a format of an uplink channel or an uplink signal for acknowledging successful decoding of the response message; determine a transmit power for hybrid automatic repeat request (HARQ) acknowledgment (ACK) information based at least in part on at least one of: a message type of the response message, a mode of random access associated with the random access message, a power control configuration used by a previous transmission of the random access message, or the format of the uplink channel or the uplink signal; and transmit the HARQ ACK information using a power control procedure
(Continued)

based at least in part on the transmit power. Numerous other aspects are provided.

30 Claims, 5 Drawing Sheets

(51) Int. Cl.
  H04W 52/08      (2009.01)
  H04W 52/36      (2009.01)
  H04W 72/21      (2023.01)
  H04W 74/04      (2009.01)
  H04W 74/0833    (2024.01)
(52) U.S. Cl.
  CPC ......... *H04W 52/367* (2013.01); *H04W 72/21* (2023.01); *H04W 74/04* (2013.01); *H04W 74/0841* (2013.01)
(58) Field of Classification Search
  CPC .......... H04W 52/146; H04W 74/0841; H04W 74/04; H04W 52/48; H04W 74/0833
  USPC ................................. 370/328, 329, 330, 331
  See application file for complete search history.

(56) References Cited

U.S. PATENT DOCUMENTS

| | | | | |
|---|---|---|---|---|
| 11,647,543 | B2* | 5/2023 | Dinan | ............... H04W 74/0833 370/329 |
| 2007/0077956 | A1 | 4/2007 | Julian et al. | |
| 2010/0034162 | A1 | 2/2010 | Ou et al. | |
| 2012/0069815 | A1* | 3/2012 | Aiba | ..................... H04L 5/0053 370/329 |
| 2013/0329688 | A1 | 12/2013 | Yang et al. | |
| 2015/0124746 | A1 | 5/2015 | Wu et al. | |
| 2017/0332359 | A1 | 11/2017 | Tsai et al. | |
| 2018/0054837 | A1* | 2/2018 | Islam | .................... H04W 72/30 |
| 2018/0324822 | A1 | 11/2018 | Tie et al. | |
| 2019/0190659 | A1 | 6/2019 | Tang | |
| 2020/0137806 | A1* | 4/2020 | Islam | .................... H04B 7/0408 |
| 2020/0305183 | A1* | 9/2020 | Papasakellariou | .. H04W 52/243 |
| 2021/0168862 | A1* | 6/2021 | Murray | ............... H04W 74/002 |
| 2022/0131643 | A1 | 4/2022 | Park et al. | |
| 2022/0248410 | A1* | 8/2022 | Lee | ........................ H04W 52/32 |
| 2023/0319895 | A1* | 10/2023 | Park | ...................... H04W 72/23 370/329 |

OTHER PUBLICATIONS

Nokia, et al., "On 2-Step RACH Procedure", 3GPP TSG RAN WG1 #97, R1-1906747, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, May 13, 2019, XP051728198, 23 Pages.
Supplementary European Search Report—EP19947982—Search Authority—The Hague—May 23, 2023.
Huawei, et al., "Corrections on Physical Layer SR," R1-1808130, 3GPP TSG RAN WG1 Meeting #94, Aug. 20-24, 2018 (Aug. 24, 2018), section 3, 6 pages.
Huawei, et al., "Feature Lead Summary of Physical Layer SR in feNB-IOT," 3GPP TSG RAN WG1 Meeting #94, R1-1809568, Aug. 20-24, 2018 (Aug. 24, 2018) section 2, 6 pages.
International Search Report and Written Opinion—PCT/CN2019/109811—ISA/EPO—Jun. 30, 2020.
Taiwan Search Report—TW109134413—TIPO—Mar. 26, 2024.

* cited by examiner

POWER CONTROL FOR HYBRID AUTOMATIC REPEAT REQUEST FEEDBACK SIGNAL IN RANDOM ACCESS

CROSS-REFERENCE TO RELATED APPLICATION

This application is a 371 national stage of Patent Cooperation Treaty (PCT) Application No. PCT/CN2019/109811 filed on Oct. 3, 2019, entitled "POWER CONTROL FOR HYBRID AUTOMATIC REPEAT REQUEST FEEDBACK SIGNAL IN RANDOM ACCESS," which is hereby expressly incorporated by reference herein.

FIELD OF THE DISCLOSURE

Aspects of the present disclosure generally relate to wireless communication and to techniques and apparatuses for power control for a hybrid automatic repeat request (HARD) feedback signal in random access.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a response message associated with a random access message, wherein the response message includes an identifier of the UE; selecting a format of an uplink channel or an uplink signal for acknowledging successful decoding of the response message; determining a transmit power for hybrid automatic repeat request (HARQ) acknowledgment (ACK) information based at least in part on at least one of: a message type of the response message, a mode of random access associated with the random access message, a power control configuration used by a previous transmission of the random access message, or the format of the uplink channel or the uplink signal; and transmitting the HARQ ACK information using a power control procedure based at least in part on the transmit power and the identifier.

In some aspects, a UE for wireless communication may include memory and one or more processors operatively coupled to the memory. The memory and the one or more processors may be configured to receive a response message associated with a random access message, wherein the response message includes an identifier of the UE; select a format of an uplink channel or an uplink signal for acknowledging successful decoding of the response message; determine a transmit power for HARQ ACK information based at least in part on at least one of: a message type of the response message, a mode of random access associated with the random access message, a power control configuration used by a previous transmission of the random access message, or the format of the uplink channel or the uplink signal; and transmit the HARQ ACK information using a power control procedure based at least in part on the transmit power and the identifier.

In some aspects, a non-transitory computer-readable medium may store one or more instructions for wireless communication. The one or more instructions, when executed by one or more processors of a UE, may cause the one or more processors to: receive a response message associated with a random access message, wherein the response message includes an identifier of the UE; select a format of an uplink channel or an uplink signal for acknowledging successful decoding of the response message; determine a transmit power for HARQ ACK information based at least in part on at least one of: a message type of the response message, a mode of random access associated with the random access message, a power control configuration used by a previous transmission of the random access message, or the format of the uplink channel or the uplink signal; and transmit the HARQ ACK information using a power control procedure based at least in part on the transmit power and the identifier.

In some aspects, an apparatus for wireless communication may include means for receiving a response message associated with a random access message, wherein the response message includes an identifier of the apparatus; means for selecting a format of an uplink channel or an uplink signal for acknowledging successful decoding of the response message; means for determining a transmit power for HARQ ACK information based at least in part on at least one of: a message type of the response message, a mode of random access associated with the random access message, a power control configuration used by a previous transmission of the random access message, or the format of the uplink channel or the uplink signal; and means for transmitting the HARQ ACK information using a power control procedure based at least in part on the transmit power and the identifier.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
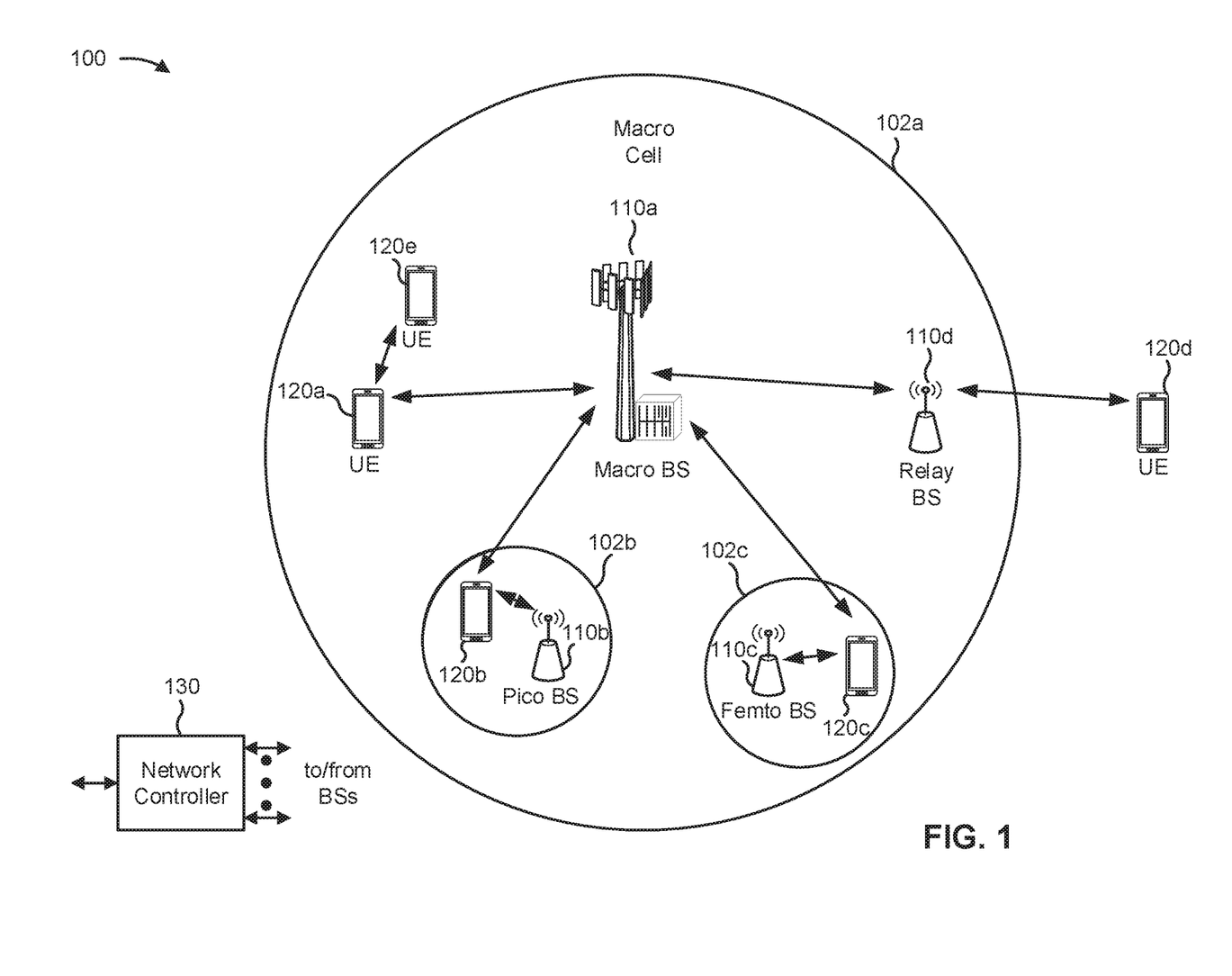
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
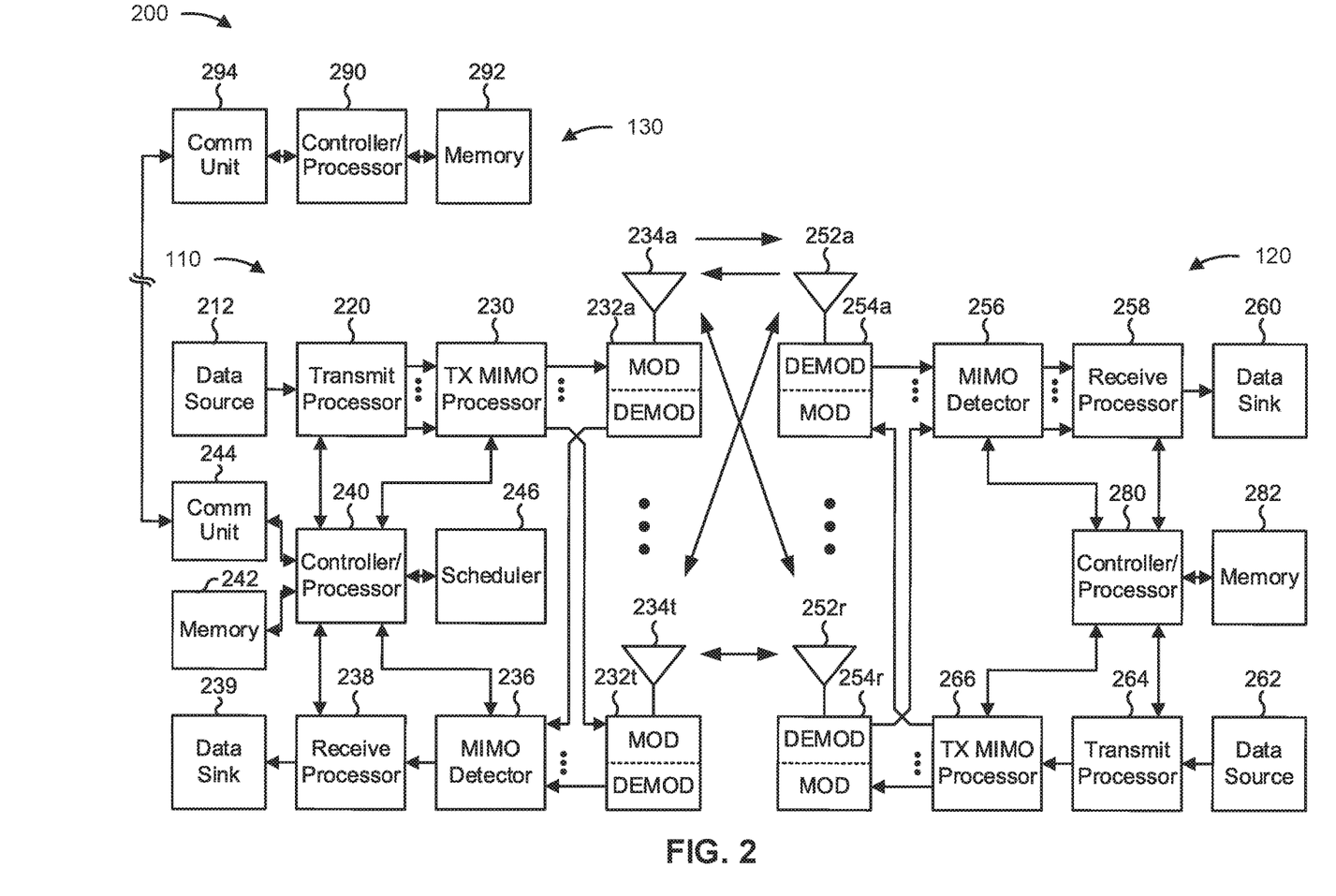
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with power control for a HARQ ACK feedback signal in random access, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5 and/or other processes as described herein. A scheduler 246 may schedule UEs for data transmission on the downlink and/or uplink.

In some aspects, UE 120 may include means for receiving a response message associated with a random access message, wherein the response message includes an identifier of the UE; means for selecting a format of an uplink channel or an uplink signal for acknowledging successful decoding of the response message; means for determining a transmit power for hybrid automatic repeat request (HARQ) acknowledgment (ACK) information; means for transmitting the HARQ ACK information using a power control procedure based at least in part on the transmit power and the identifier; means for receiving a transmit power control command in at least one of: downlink control information (DCI) carried by a downlink control channel of the response message, or a success random access response carried by a downlink shared channel of the response message; means for receiving signaling indicating a configuration for at least one of a power control mode or a power control parameter for determining the transmit power; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

A UE may use a random access procedure to access a cell. For example, the random access procedure may include a two-step random access procedure, a four-step random access procedure, and/or the like. In NR, a two-step random access procedure can be used for contention-based random access (CBRA) and for contention-free random access (CFRA). For example, CBRA may be usable in any RRC state (e.g., idle, inactive, or connected), whereas CFRA may be usable in an RRC connected state.

In some cases, a UE may initiate a two-step random access procedure by transmitting a random access message, such as random access channel (RACH) Message A. The two-step random access procedure may proceed differently depending on an outcome of a base station's processing of the random access message. For example, the base station may transmit a success random access response (RAR), a fallback RAR, or a backoff indicator in a response message depending on an outcome of processing of a preamble and/or a payload of the random access message. For example, the base station may provide the success RAR, the fallback RAR, or the backoff indicator in a response message such as a RACH Message B.

The UE may retransmit the payload and/or the preamble of the random access message (e.g., may reattempt the two-step random access process or fall back to the four-step random access procedure) if the UE does not receive a success RAR. The base station may respond with a success RAR or a fourth message of a four-step random access procedure if the base station can decode the retransmitted preamble and/or payload. If the UE successfully decodes the success RAR or the fourth message, then the UE may transmit HARQ ACK information to complete the random access procedure.

The HARQ ACK information can be mapped to multiple different uplink physical channels or physical signals, which may be associated with different signaling overhead and reliability. Furthermore, the transmission of the HARQ ACK information may introduce inter-cell or intra-cell interference and may use UE battery power. Thus, a single or inflexible approach to transmit power determination for the HARQ ACK information may increase interference and UE battery power usage.

Some techniques and apparatuses described herein provide power control for HARQ ACK information associated with a random access procedure. For example, some techniques and apparatuses described herein provide for mapping of the HARQ ACK information to one or more bits. Some techniques and apparatuses described herein provide open loop power control or closed loop power control for the HARQ ACK information. For example, a power control formula based at least in part on a bandwidth, carrier, cell, and transmit occasion of the HARQ ACK information is provided herein. The power control may be further based at least in part on a format of an uplink channel or uplink signal used for the HARQ ACK information, a message type of the response message, a mode of random access associated with the response message, a power control configuration used for determining the transmit power, and/or the like. In this way, inter-cell and intra-cell interference may be reduced and UE power utilization may be improved.

Figure 3:
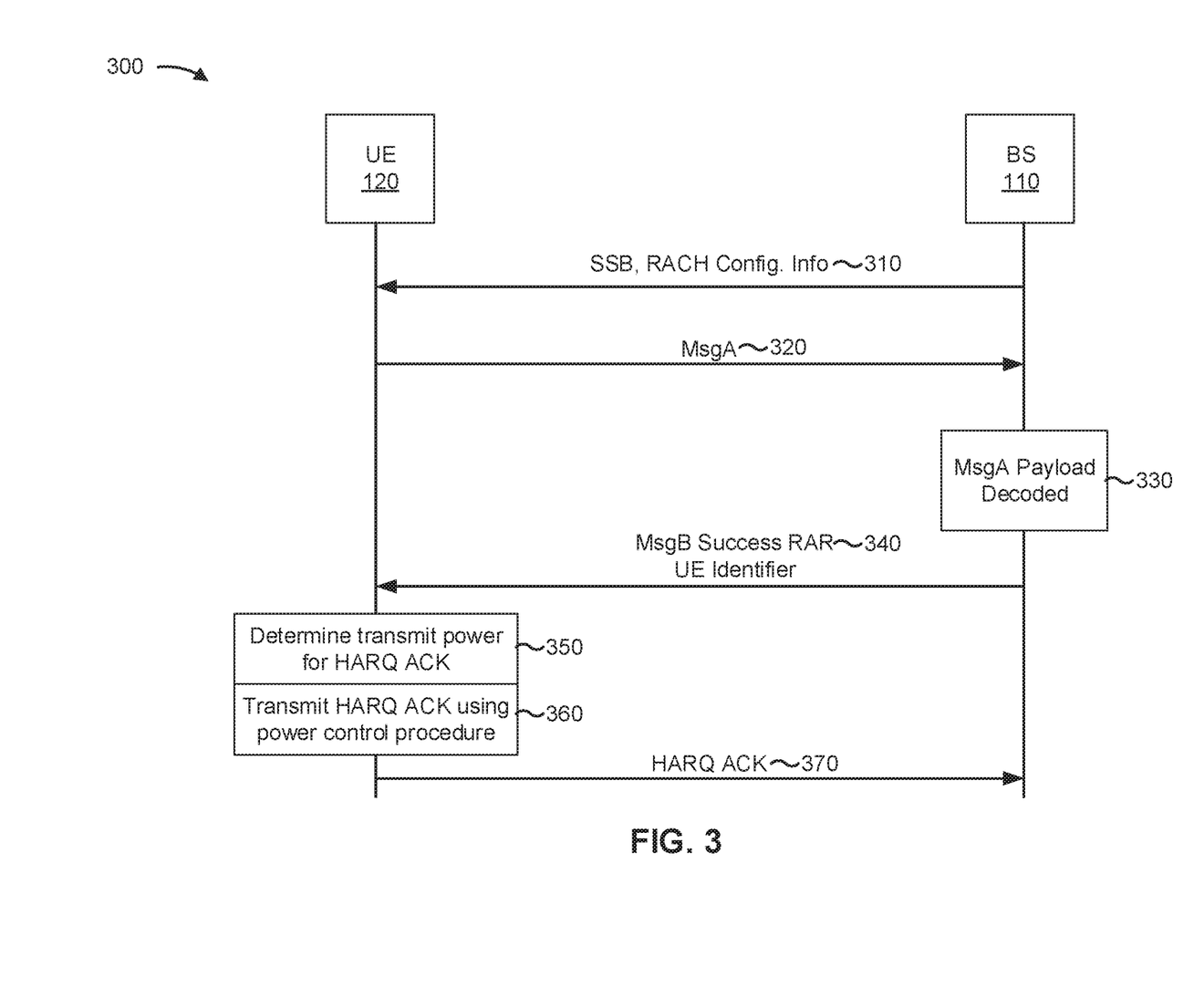
FIG. 3 is a diagram illustrating an example of hybrid automatic repeat request (HARQ) acknowledgment (ACK) transmit power determination for a two-step random access procedure, in accordance with various aspects of the present disclosure.

FIG. 3 is a diagram illustrating an example 300 of HARQ ACK transmit power determination for a two-step random access procedure, in accordance with various aspects of the present disclosure. As shown, example 300 includes a UE 120 and a BS 110.

As shown by reference number 310, the BS 110 may provide a synchronization signal block and random access channel (RACH) configuration information to the UE 120. The RACH configuration information may identify a configuration for a two-step RACH procedure. In some aspects, the RACH configuration information may identify a power control parameter. For example, the power control parameter may be different for a CBRA than for a CFRA. In some aspects, the RACH configuration information may include an indication of whether a response message is to use a physical uplink control channel (PUCCH), uplink control information (UCI) multiplexed with a physical uplink shared channel (PUSCH), an uplink reference signal, and/or the like. In some aspects, the RACH configuration information may indicate a format for a response message (e.g., a long PUCCH format, a short PUCCH format, and/or the like). In some aspects, the RACH configuration information may indicate a bandwidth part, an uplink carrier, a numerology, a reference index for pathloss measurement, and/or the like. In some aspects, the RACH configuration information may indicate a random access preamble index allocated for the UE in a CFRA procedure.

As shown by reference number 320, the UE 120 may transmit, and the base station 110 may receive, a random access message of a two-step random access procedure (e.g., RACH MsgA or Message A). For example, the UE 120 may transmit the random access message in accordance with the RACH configuration information received in connection with reference number 310. The random access message may include a preamble and a payload (e.g., a PUSCH). The BS 110 may perform different actions based on whether the BS 110 successfully decodes one or more of the preamble and the payload. In some aspects, the UE 120 may transmit the preamble and/or the payload with a particular power control configuration, which is described in more detail elsewhere herein.

As shown by reference number 330, in example 300, the BS 110 successfully decodes the payload and the preamble. For an example of when the BS 110 detects only the preamble and not the payload, refer to FIG. 4. If the BS 110 fails to decode the preamble, then the BS 110 may perform no action and the UE 120 may retransmit the message shown by reference number 320. In example 300, the BS 110 may detect the preamble, identify the payload based at least in part on the preamble, and decode the payload. As shown by reference number 340, the BS 110 transmits a response message associated with the random access message shown by reference number 320. Here, the response message includes a two-step random access procedure MsgB success random access response (RAR) based at least in part on the BS 110 successfully decoding the preamble and the payload.

As further shown, the response message includes an identifier of the UE 120. For example, the identifier may be a unique identifier of the UE 120. In some aspects, the identifier may include an inactive state radio network temporary identifier (RNTI), an idle state RNTI, a cell-specific RNTI, a random access preamble index (RAPID) allocated for the UE in a CFRA procedure, and/or the like. The UE 120 may provide HARQ ACK information based at least in part on identifying the identifier in the response message, as described in more detail below.

As shown by reference number 350, the UE 120 may determine a transmit power for HARQ ACK information. For example, the UE 120 may successfully decode the response message, and may accordingly provide HARQ ACK information indicating that the response message was successfully decoded, thereby completing the random access procedure. Techniques and apparatuses described herein provide for determination of a transmit power and/or a power control procedure for transmission of the HARQ ACK information, thereby improving UE power utilization and reducing inter-cell interference and intra-cell interference.

The UE 120 may determine the transmit power based at least in part on a power control configuration. In some aspects, power control parameters associated with the power control configuration may be indicated in system information (SI) (e.g., for inactive or idle UEs), radio resource control (RRC) signaling (e.g., for connected UEs), using a lookup table associated with two-step RACH, and/or the like. For example, the UE 120 may receive signaling indicating a configuration for at least one of power control mode (e.g., open loop power control, closed loop power control, and/or the like), or a power control parameter (described in more detail below in connection with Formula 1). In such a case, an index of the lookup table may be indicated to the UE 120 in system information, such as a system information block.

In some aspects, the UE 120 may perform a power control procedure, such as an open loop power control procedure, a closed loop power control procedure, or a combination of an open loop power control procedure and a closed loop power control procedure, to determine the transmit power for the HARQ ACK information. In some aspects, the UE 120 may use the following Formula 1 to determine the HARQ ACK information ($P_{HF,b,f,c}(i, q_d, l)$):

Formula 1

$$P_{HF,b,f,c}(i, q_d, l) = \\ \text{MIN} \begin{cases} P_{cmax,f,c}(i) \\ P_{0\_HF,b,f,c} + 10 \times \text{LOG}(2^\mu \times \text{Number\_RB}) + \alpha_{b,f,c} \times PL_{b,f,c}(q_d) + \Delta_{TF,b,f,c} + g_{b,f,c}(i, l) \end{cases}$$

In Formula 1, b represents a bandwidth part, f represents a carrier, c represents a cell, and i represents a transmit occasion. A pathloss compensation value is represented by $\alpha_{b,f,c}$. A pathloss value at a reference signal index $q_d$ is represented by $PL_{b,f,c}(q_d)$. A nominal UE transmit power is represented by $P_{0\_HF,b,f,c}$. An MCS-dependent offset is represented by $\Delta_{TF,b,f,c}$. A maximum transmit power of the UE 120 is represented by $P_{cmax,f,c}(i)$ A dynamic offset is represented by $g_{b,f,c}(i,l)$. In some aspects, the dynamic offset may be defined by $g_{b,f,c}(i,l)=g_{b,f,c}(i-i_0,l)+\Sigma_{m=0}^{D_i}\delta_{HF,b,f,c}(m,l)$ and $g_{b,f,c}(0,l)=\Delta_{ramp-up,b,f,c}+\delta_{msgB,b,f,c}$. Each of the above terms of Formula 1 is described in more detail below.

The pathloss compensation value ($\alpha_{b,f,c}$) may include a full pathloss compensation value (e.g., fully offsetting a pathloss of the HARQ ACK information) or a partial pathloss value (e.g., partially offsetting the pathloss of the HARQ ACK information). In some aspects, the pathloss compensation value may be based at least in part on the uplink channel or the uplink signal. For example, if the uplink channel is a PUCCH, then the pathloss compensation value may be a full pathloss compensation value. If the uplink channel is UCI piggybacked on a PUSCH, then the pathloss compensation value may be a full pathloss compensation value or a partial pathloss compensation value. In such a case, the pathloss compensation value may be based on a power control configuration of the PUSCH on which the UCI is piggybacked. If the uplink signal is an uplink reference signal, then the pathloss compensation value may be a full pathloss compensation value or a partial pathloss compensation value.

In some aspects, the nominal UE transmit power may be based at least in part on a previous nominal UE transmit power of the random access message (e.g., the random access message shown by reference number 310 or a transmission of a random access message before the random access message shown by reference number 310). For example, the nominal UE transmit power may be based at least in part on the nominal UE transmit power of the preamble of the random access message or of the payload of the random access message. In some aspects, the nominal UE transmit power may be based at least in part on the previous nominal UE transmit power and based at least in part on an offset, such as a UE-specific offset. In some aspects, the nominal UE transmit power may be indicated using signaling, such as system information or radio resource control (RRC) signaling. In some aspects, the nominal UE transmit power may be based at least in part on an indicated value (e.g., using SI or RRC signaling) with an offset, such as a UE-specific offset.

The MC S-dependent offset ($\Delta_{TF,b,f,c}$) may take into account the MCS based at least in part on the transport format (TF) of the HARQ ACK information. In some aspects, the MCS-dependent offset may be set to a fixed value, such as zero. In some aspects, the MC S-dependent offset may follow a configuration rule for the physical channel or physical signal carrying the HARQ ACK. For example, for a HARQ ACK information provided using a piggybacked UCI, an offset (e.g., a semi-static offset) $\beta_{offset}^{PUSCH}$ may be configured (e.g., using RRC signaling and/or the like).

The dynamic offset ($g_{b,f,c}(i,l)$) may be based at least in part on a sum of a power ramp-up for an open loop power control procedure and a transmit power control (TPC) accumulation for a closed loop power control procedure. This may be represented by $g_{b,f,c}(i,l)=g_{b,f,c}(i-i_0,l)+\Sigma_{m=0}^{D_i}\delta_{HF,b,f,c}(m,l)$ and $g_{b,f,c}(0,l)=\Delta_{ramp-up,b,f,c}+\delta_{msgB,b,f,c}$. In some aspects, the size of the power ramp-up may use a power control configuration for a preamble or a payload of the random access message shown by reference number 310. In some aspects, the size of the power ramp-up may be configured using SI, RRC signaling, a lookup table, and/or the like.

In some aspects, the UE 120 may use a bandwidth-dependent offset (not shown in the above formula) to determine the transmit power. For example, in some aspects, the bandwidth-dependent offset may be based at least in part on a numerology of the uplink channel or the uplink signal, a number of allocated resource blocks (RBs) of the uplink channel of the uplink signal, and/or the like. In some aspects, the bandwidth-dependent offset may be based at least in part on a scaling factor (e.g., a scaling factor applied to a value determined based at least in part on the numerology and the number of allocated RBs), which may be configured using SI, RRC, and/or the like.

As shown in the above formula, the UE 120 may use a pathloss value determined in accordance with a reference signal index and adjusted by the pathloss compensation value ($\alpha_{b,f,c}\times PL_{b,f,c}(q_d)$). In some aspects, the reference signal index may refer to a preamble or a payload of the random access message shown by reference number 310, or may be signaled to the UE 120 (e.g., using SI, RRC signaling, and/or the like) in a reference signal configuration.

In some aspects, the UE 120 may suspend a power ramping counter. For example, the UE 120 may suspend the power ramping counter based at least in part on a power control configuration for a preamble or a payload of the random access message shown by reference number 310. As another example, the UE 120 may suspend the power ramping counter when the UE 120 changes a transmit spatial counter for transmission of the HARQ ACK information, when the UE 120 changes a bandwidth part, when the UE 120 changes an uplink carrier, or based at least in part on receiving DCI indicating to suspend the power ramping counter.

As shown by reference number 360, the UE 120 may transmit the HARQ ACK information (shown by reference number 370) using a power control procedure and based at least in part on the transmit power determined in connection with reference number 350. In some aspects, the power control procedure may be used to determine the transmit power. In some aspects, the transmit power may be used as part of the power control procedure.

In some aspects, the UE 120 may determine the transmit power and/or perform the power control procedure based at least in part on a TPC command. A TPC command may indicate that the UE 120 is to increment or decrement the transmit power. For example, the UE 120 may track TPC commands from the BS 110 in order to determine the transmit power. In some aspects, for open loop power control, TPC commands may be disabled. In some aspects, for closed loop power control, the TPC command may be carrier in DCI of a physical downlink control channel (PDCCH) of the MsgB success RAR shown by reference number 340. In some aspects, the TPC command may be carried in a sub-protocol data unit (sub-PDU) of a physical downlink shared channel (PDSCH) of the MsgB success RAR shown by reference number 340. In some aspects, the TPC command may be a UE-specific TPC command. In some aspects, the TPC command may be multicast to a group of UEs, including the UE 120, as a group-common TPC command.

As shown by reference number 370, the UE 120 may transmit the HARQ ACK information. In some aspects, the HARQ ACK information may be mapped to a single bit. In some aspects, the HARQ ACK information may be mapped to multiple bits. For example, the multiple bits may include a repetition or coded sequence of the HARQ ACK information, or a multiplexing of the HARQ ACK information with another uplink transmission (e.g., a scheduling request, a beam management report, a channel state report, and/or the like). In some aspects, the HARQ ACK information may be mapped to a PUCCH, such as a PUCCH associated with a short PUCCH format or a long PUCCH format. In some aspects, the UE 120 and/or the BS 110 may determine the format of the uplink channel based at least in part on at least one of a waveform of the random access message (e.g., CP-OFDM or DFT-s-OFDM), a latency requirement of a random access procedure associated with the random access message, or a multiplexing capacity requirement of the UE 120.

In some aspects, the HARQ ACK information may be mapped to UCI multiplexed with a PUSCH (e.g., by puncturing or rate matching the PUSCH). In some aspects, the HARQ ACK information may be mapped to an uplink reference signal, such as a sounding reference signal, a demodulation reference signal, a preamble, a sequence associated with a threshold peak to average power ratio, and/or the like. The usage of a signal having a threshold peak to average power ratio (e.g., a low peak to average power ratio) may improve performance of the signal by reducing degradation of the waveform.

As indicated above, FIG. 3 is provided as an example. Other examples may differ from what is described with respect to FIG. 3.

Figure 4:
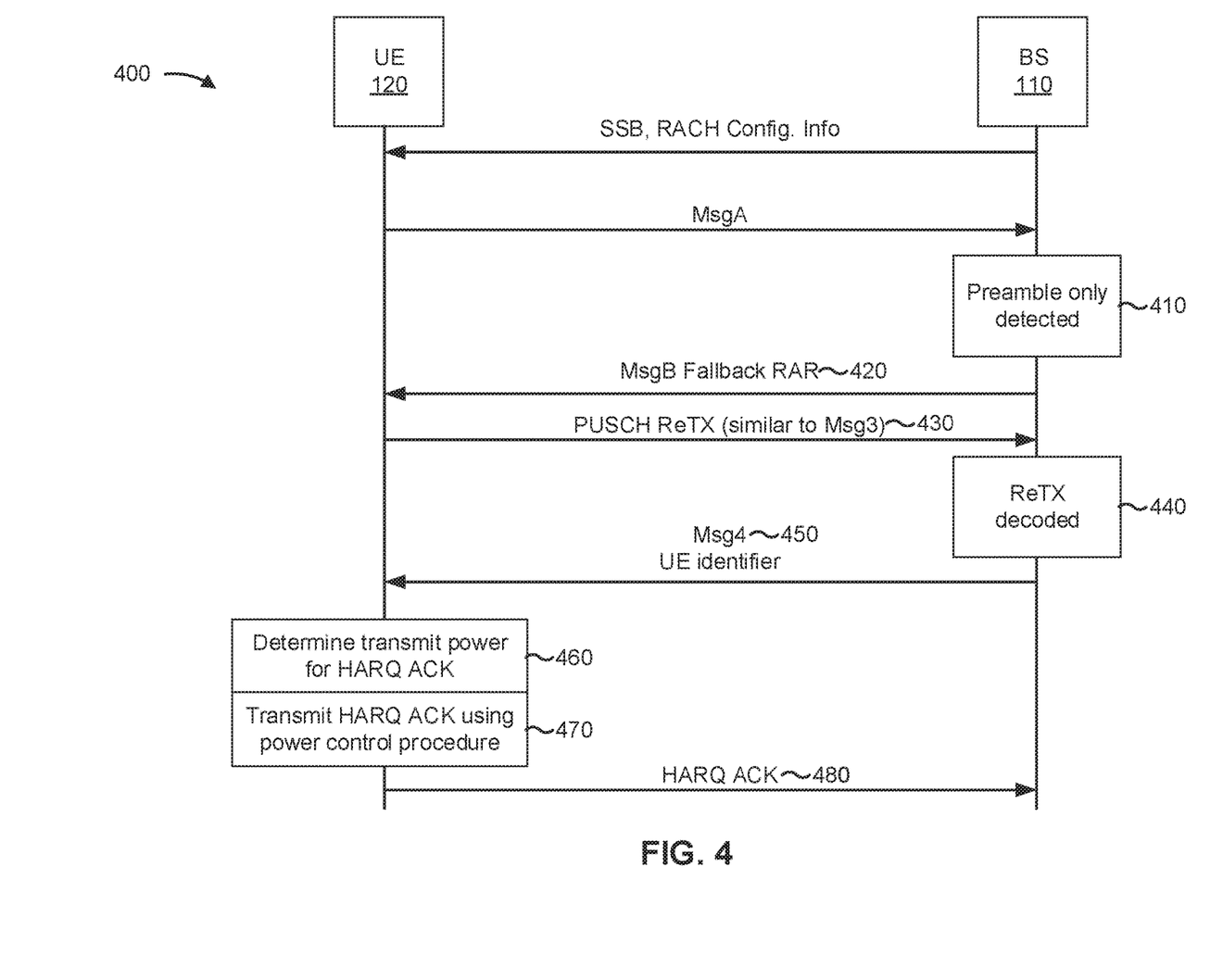
FIG. 4 is a diagram illustrating an example of HARQ ACK transmit power determination for a four-step random access procedure associated with a fallback from a two-step random access procedure, in accordance with various aspects of the present disclosure.

FIG. 4 is a diagram illustrating an example 400 of HARQ ACK transmit power determination for a four-step random access procedure associated with a fallback from a two-step random access procedure, in accordance with various aspects of the present disclosure. Example 400 includes a UE 120 and a BS 110. As shown in FIG. 4, and by reference number 410, example 400 is an example where the BS 110 detects only a preamble of the RACH Message A. In other words, in example 400, the BS 110 fails to decode the payload of the RACH Message A.

As shown by reference number 420, the BS 110 may transmit an indication that the BS 110 failed to decode the payload of the RACH Message A. Here, the indication includes a fallback RAR, such as a sub-PDU indicating that the UE 120 is to fall back to a four-step random access procedure. Accordingly, as shown by reference number 430, the UE 120 retransmits the payload (e.g., the PUSCH) of the random access message using a message similar to Message 3 of the four-step random access procedure. As shown by reference number 440, the BS 110 successfully decodes the retransmission (ReTX) of the payload. Accordingly, as shown by reference number 450, the BS 110 transmits a response message (e.g., a RACH Message 4 of a four-step RACH procedure). As further shown, the response message includes an identifier of the UE 120.

As shown by reference numbers 460 and 470, the UE 120 may determine a transmit power for the HARQ ACK information, and may transmit the HARQ ACK information (shown by reference number 480). The determination of the transmit power and the power control procedure are described in more detail in connection with reference numbers 350 and 360 of FIG. 3, above. It should be understood that references to determination of the transmit power or the power control procedure based at least in part on the random access message shown by reference number 320 can also apply to the determination of the transmit power or the power control procedure for transmission of the HARQ ACK information 480 based at least in part on the MsgA shown in FIG. 4.

As indicated above, FIG. 4 is provided as an example. Other examples may differ from what is described with respect to FIG. 4.

Figure 5:
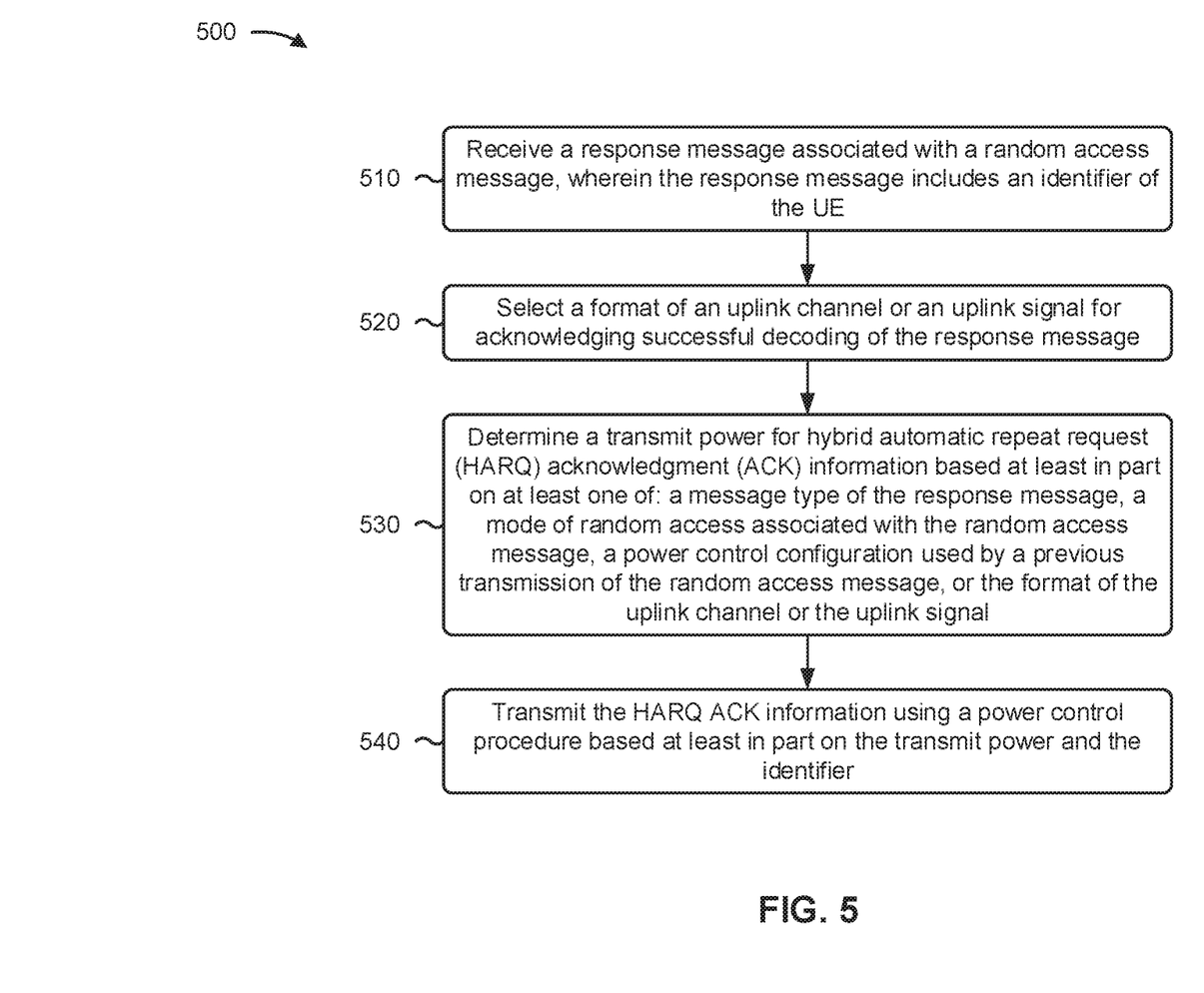
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with power control for a HARQ feedback signal in random access.

As shown in FIG. 5, in some aspects, process 500 may include receiving a response message associated with a random access message, wherein the response message includes an identifier of the UE (block 510). For example, the UE (e.g., using receive processor 258, transmit processor 264, controller/processor 280, memory 282, and/or the like) may receive a response message associated with a random access message, as described above. In some aspects, the response message includes an identifier of the UE.

As further shown in FIG. 5, in some aspects, process 500 may include selecting a format of an uplink channel or an uplink signal for acknowledging successful decoding of the response message (block 520). For example, the UE (e.g., using receive processor 258, transmit processor 264, controller/processor 280, memory 282, and/or the like) may select a format of an uplink channel or an uplink signal for acknowledging successful decoding of the response message, as described above. The format may include, for example a PUCCH format, an uplink reference signal format, a UCI piggybacked on a PUSCH format, and/or the like. In some aspects, process 500 may not include selecting the format of the uplink channel or the uplink signal.

As further shown in FIG. 5, in some aspects, process 500 may include determining a transmit power for HARQ ACK information based at least in part on at least one of: a message type of the response message, a mode of random access associated with the random access message, a power control configuration used by a previous transmission of the random access message, or the format of the uplink channel or the uplink signal (block 530). For example, the user equipment (UE) (e.g., using receive processor 258, transmit processor 264, controller/processor 280, memory 282, and/or the like) may determine a transmit power for hybrid automatic repeat request (HARQ) acknowledgment (ACK) information based at least in part on at least one of a message type of the response message, a mode of random access associated with the random access message (e.g., a two-step mode, a four-step fallback mode, and/or the like), a power control configuration used by a previous transmission of the random access message (e.g., random access message 320, a previous transmission of a random access message before random access message 320, and/or the like), or the format of the uplink channel or the uplink signal, as described above.

As further shown in FIG. 5, in some aspects, process 500 may include transmitting the HARQ ACK information using a power control procedure based at least in part on the transmit power and based at least in part on the identifier (block 540). For example, the user equipment (UE) (e.g., using receive processor 258, transmit processor 264, controller/processor 280, memory 282, and/or the like) may transmit the HARQ ACK information using a power control procedure based at least in part on the transmit power and the identifier, as described above.

Process 500 may include additional aspects, such as any single aspect or any combination of aspects described below and/or in connection with one or more other processes described elsewhere herein.

In a first aspect, the message type of the response message comprises at least one of: a success random access response of a two-step random access procedure, or a RACH Message 4 of a four-step random access procedure.

In a second aspect, alone or in combination with the first aspect, the HARQ ACK information indicates that the response message was successfully decoded and the identifier was detected.

In a third aspect, alone or in combination with one or more of the first and second aspects, the identifier comprises at least one of: an inactive or idle state radio network temporary identifier (RNTI), a cell-specific RNTI, or a random access preamble index (RAPID) allocated for the UE in a contention free random access procedure.

In a fourth aspect, alone or in combination with one or more of the first through third aspects, the HARQ ACK information is mapped to a single bit.

In a fifth aspect, alone or in combination with one or more of the first through fourth aspects, the HARQ ACK information is mapped to multiple bits, and the multiple bits are associated with at least one of: a repetition or coded sequence of the HARQ ACK information, or a multiplexing of the HARQ ACK information with another uplink transmission.

In a sixth aspect, alone or in combination with one or more of the first through fifth aspects, the format of the uplink channel is determined based at least in part on at least one of: a waveform of the random access message, a latency requirement of a random access procedure associated with the random access message, or a multiplexing capacity requirement of the UE, and the uplink channel comprises a physical uplink control channel.

In a seventh aspect, alone or in combination with one or more of the first through sixth aspects, the HARQ ACK information is mapped to uplink control information (UCI) that is multiplexed with a physical uplink shared channel based at least in part on puncturing or rate matching the physical uplink shared channel.

In an eighth aspect, alone or in combination with one or more of the first through seventh aspects, the HARQ ACK information is mapped to an uplink reference signal.

In a ninth aspect, alone or in combination with one or more of the first through eighth aspects, the power control procedure is an open loop power control procedure, a configuration associated with the open loop power control procedure is based at least in part on a preamble or a payload of a previous transmission of the random access message.

In a tenth aspect, alone or in combination with one or more of the first through ninth aspects, the power control procedure is a closed loop power control procedure, and a configuration associated with the closed loop power control procedure is based at least in part on a preamble or a payload of a previous transmission of the random access message.

In an eleventh aspect, alone or in combination with one or more of the first through tenth aspects, process 500 includes receiving a transmit power control command in at least one of: downlink control information (DCI) carried by a downlink control channel of the response message, or a success random access response carried by a downlink shared channel of the response message.

In a twelfth aspect, alone or in combination with one or more of the first through eleventh aspects, process 500 includes receiving signaling indicating a configuration for at least one of a power control mode or a power control parameter for determining the transmit power.

In a thirteenth aspect, alone or in combination with one or more of the first through twelfth aspects, the signaling is carried by system information (SI) and radio resource control (RRC) signaling for a UE in a connected state.

In a fourteenth aspect, alone or in combination with one or more of the first through thirteenth aspects, the signaling is carried by radio resource control (RRC) signaling for a UE in a connected state.

In a fifteenth aspect, alone or in combination with one or more of the first through fourteenth aspects, determining the transmit power is based at least in part on whether the HARQ ACK information is mapped to a physical uplink control channel, uplink control information, or an uplink reference signal.

In a sixteenth aspect, alone or in combination with one or more of the first through fifteenth aspects, determining the transmit power is based at least in part on at least one of: whether a power ramping counter of the UE is suspended, whether a transmit power control (TPC) command is received, or whether a maximum transmit power of the UE is reached.

In a seventeenth aspect, alone or in combination with one or more of the first through sixteenth aspects, the power ramping counter of the UE is suspended based at least on at least one of: a change of a transmit spatial filter, a change of a bandwidth part, a change of an uplink carrier, or downlink control information received by the UE.

In an eighteenth aspect, alone or in combination with one or more of the first through seventeenth aspects, determining the transmit power is based at least in part on a nominal transmit power of the UE, wherein the nominal transmit power is based at least on at least one of: a nominal transmit power of a preamble of the previous transmission of the random access message, a nominal transmit power of a payload of the previous transmission of the random access message, a UE-specific offset, or a network-configured offset indicated by system information or radio resource control signaling.

In a nineteenth aspect, alone or in combination with one or more of the first through eighteenth aspects, determining the transmit power is based at least in part on an offset that is based at least in part on a modulation and coding scheme (MCS) of the UE, the offset is based at least in part on the format of the uplink channel or uplink signal carrying the HARQ ACK information.

In a twentieth aspect, alone or in combination with one or more of the first through nineteenth aspects, determining the transmit power is based at least in part on at least one of a power ramp-up procedure of the UE or an accumulation value associated with a transmit power control (TPC) command.

In a twenty first aspect, alone or in combination with one or more of the first through twentieth aspects, the TPC command comprises a UE-specific TPC command.

In a twenty second aspect, alone or in combination with one or more of the first through twenty first aspects, the TPC command is multicast to a group of UEs, including the UE, as a group-common TPC command.

In a twenty third aspect, alone or in combination with one or more of the first through twenty second aspects, determining the transmit power is based at least in part on a bandwidth of the uplink channel or the uplink signal.

In a twenty fourth aspect, alone or in combination with one or more of the first through twenty third aspects, determining the transmit power is based at least in part on a reference signal index configured for a pathloss measurement, wherein the reference signal index is based at least in part on at least one of: a reference signal index of a preamble or a payload of the previous transmission of the random access message, or a resource signal configuration of the UE.

In a twenty fifth aspect, alone or in combination with one or more of the first through twenty fourth aspects, the identifier is a unique identifier.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving a response message associated with a random access message;
    selecting a format of an uplink channel or an uplink signal for acknowledging successful decoding of the response message;
    determining a transmit power for hybrid automatic repeat request (HARQ) acknowledgment (ACK) information based at least in part on at least one of:
        a message type of the response message,
        a mode of random access associated with the random access message,
        a power control configuration used by a previous transmission of the random access message, or
        the format of the uplink channel or the uplink signal; and
    transmitting, based at least in part on identifying an identifier of the UE in the response message, the HARQ ACK information using a power control procedure and according to the transmit power.

2. The method of claim 1, wherein the message type of the response message comprises at least one of:
    a success random access response of a two-step random access procedure, or
    a RACH Message 4 of a four-step random access procedure.

3. The method of claim 1, wherein the HARQ ACK information indicates that the response message was successfully decoded and the identifier was detected.

4. The method of claim 1, wherein the identifier comprises at least one of:
    an inactive or idle state radio network temporary identifier (RNTI),
    a cell-specific RNTI, or
    a random access preamble index (RAPID) allocated for the UE in a contention free random access procedure.

5. The method of claim 1, wherein the HARQ ACK information is mapped to a single bit.

6. The method of claim 1, wherein the HARQ ACK information is mapped to multiple bits, and
    wherein the multiple bits are associated with at least one of:

a repetition or coded sequence of the HARQ ACK information, or
a multiplexing of the HARQ ACK information with another uplink transmission.

7. The method of claim 1, wherein the format of the uplink channel is determined based at least in part on at least one of:
a waveform of the random access message,
a latency requirement of a random access procedure associated with the random access message, or
a multiplexing capacity requirement of the UE, and
wherein the uplink channel comprises a physical uplink control channel.

8. The method of claim 1, wherein the HARQ ACK information is mapped to uplink control information (UCI) that is multiplexed with a physical uplink shared channel based at least in part on puncturing or rate matching the physical uplink shared channel.

9. The method of claim 1, wherein the HARQ ACK information is mapped to an uplink reference signal.

10. The method of claim 1, wherein the power control procedure is an open loop power control procedure, wherein a configuration associated with the open loop power control procedure is based at least in part on a preamble or a payload of a previous transmission of the random access message, and
wherein transmission of a transmit power control (TPC) command is disabled for the open loop power control procedure.

11. The method of claim 1, wherein the power control procedure is a closed loop power control procedure, and wherein a configuration associated with the closed loop power control procedure is based at least in part on a preamble or a payload of a previous transmission of the random access message.

12. The method of claim 11, further comprising:
receiving a transmit power control command in at least one of:
downlink control information (DCI) carried by a downlink control channel of the response message, or
a success random access response carried by a downlink shared channel of the response message.

13. The method of claim 1, further comprising:
receiving signaling indicating a configuration for at least one of a power control mode or a power control parameter for determining the transmit power.

14. The method of claim 13, wherein the signaling is carried by system information (SI) and radio resource control (RRC) signaling for a UE in a connected state.

15. The method of claim 13, wherein the signaling is carried by radio resource control (RRC) signaling for a UE in a connected state.

16. The method of claim 1, wherein determining the transmit power is based at least in part on whether the HARQ ACK information is mapped to a physical uplink control channel, uplink control information, or an uplink reference signal.

17. The method of claim 1, wherein determining the transmit power is based at least in part on at least one of:
whether a power ramping counter of the UE is suspended,
whether a transmit power control (TPC) command is received, or
whether a maximum transmit power of the UE is reached.

18. The method of claim 17, wherein the power ramping counter of the UE is suspended based at least on at least one of:
a change of a transmit spatial filter,
a change of a bandwidth part,
a change of an uplink carrier, or
downlink control information received by the UE.

19. The method of claim 1, wherein determining the transmit power is based at least in part on a nominal transmit power of the UE,
wherein the nominal transmit power is based at least on at least one of:
a nominal transmit power of a preamble of the previous transmission of the random access message,
a nominal transmit power of a payload of the previous transmission of the random access message,
a UE-specific offset, or
a network-configured offset indicated by system information or radio resource control signaling.

20. The method of claim 1, wherein determining the transmit power is based at least in part on an offset that is based at least in part on a modulation and coding scheme (MCS) of the UE, wherein the offset is based at least in part on the format of the uplink channel or the uplink signal carrying the HARQ ACK information.

21. The method of claim 1, wherein determining the transmit power is based at least in part on at least one of a power ramp-up procedure of the UE or an accumulation value associated with a transmit power control (TPC) command.

22. The method of claim 21, wherein the TPC command comprises a UE-specific TPC command.

23. The method of claim 21, wherein the TPC command is multicast to a group of UEs, including the UE, as a group-common TPC command.

24. The method of claim 1, wherein determining the transmit power is based at least in part on a bandwidth of the uplink channel or the uplink signal.

25. The method of claim 1, wherein determining the transmit power is based at least in part on a reference signal index configured for a pathloss measurement, wherein the reference signal index is based at least in part on at least one of:
a reference signal index of a preamble or a payload of the previous transmission of the random access message, or
a reference signal configuration of the UE.

26. The method of claim 1, wherein the identifier is a unique identifier.

27. A user equipment (UE) for wireless communication, comprising:
one or more memories; and
one or more processors coupled to the one or more memories, the one or more processors configured to:
receive a response message associated with a random access message;
select a format of an uplink channel or an uplink signal for acknowledging successful decoding of the response message;
determine a transmit power for hybrid automatic repeat request (HARQ) acknowledgment (ACK) information based at least in part on at least one of:
a message type of the response message,
a mode of random access associated with the random access message,
a power control configuration used by a previous transmission of the random access message, or
the format of the uplink channel or the uplink signal; and
transmit, based at least in part on identifying an identifier of the UE in the response message, the HARQ ACK information using a power control procedure and according to the transmit power.

28. The UE of claim 27, wherein the message type of the response message comprises at least one of:
- a success random access response of a two-step random access procedure, or
- a RACH Message 4 of a four-step random access procedure.

29. A non-transitory computer-readable medium storing one or more instructions for wireless communication, the one or more instructions comprising:
- one or more instructions that, when executed by one or more processors of a user equipment (UE), cause the one or more processors to:
  - receive a response message associated with a random access message;
  - select a format of an uplink channel or an uplink signal for acknowledging successful decoding of the response message;
  - determine a transmit power for hybrid automatic repeat request (HARQ) acknowledgment (ACK) information based at least in part on at least one of:
    - a message type of the response message,
    - a mode of random access associated with the random access message,
    - a power control configuration used by a previous transmission of the random access message, or
    - the format of the uplink channel or the uplink signal; and
  - transmit, based at least in part on identifying an identifier of the UE in the response message, the HARQ ACK information using a power control procedure and according to the transmit power.

30. An apparatus for wireless communication, comprising:
- means for receiving a response message associated with a random access message;
- means for selecting a format of an uplink channel or an uplink signal for acknowledging successful decoding of the response message;
- means for determining a transmit power for hybrid automatic repeat request (HARQ) acknowledgment (ACK) information based at least in part on at least one of:
  - a message type of the response message,
  - a mode of random access associated with the random access message,
  - a power control configuration used by a previous transmission of the random access message, or
  - the format of the uplink channel or the uplink signal; and
- means for transmitting, based at least in part on identifying an identifier of the apparatus in the response message, the HARQ ACK information using a power control procedure and according to the transmit power.

* * * * *